United States Patent [19]

Ogiwara

[11] 4,348,490

[45] Sep. 7, 1982

[54] FRICTION MATERIAL

[75] Inventor: Osao Ogiwara, Hanyu, Japan

[73] Assignee: Akebono Brake Industry Company, Ltd., Tokyo, Japan

[21] Appl. No.: 227,706

[22] Filed: Jan. 23, 1981

[30] Foreign Application Priority Data

Jan. 30, 1980 [JP] Japan ................................. 55/9810

[51] Int. Cl.$^3$ .............................................. C08K 00/00
[52] U.S. Cl. ................................... 523/156; 524/409; 524/423; 524/425; 524/496
[58] Field of Search ............ 260/38, 998, 13, DIG. 39

[56] References Cited

U.S. PATENT DOCUMENTS

| | | | |
|---|---|---|---|
| 4,051,097 | 9/1977 | Aldrich | 260/38 |
| 4,119,591 | 10/1978 | Aldrich | 260/38 |
| 4,145,223 | 3/1979 | Iwata | 260/38 |
| 4,178,278 | 12/1979 | Reynolds | 260/38 |
| 4,219,452 | 8/1980 | Littlefield | 260/998.13 |
| 4,278,584 | 7/1981 | Noguchi et al. | 260/38 |

*Primary Examiner*—Lewis T. Jacobs
*Attorney, Agent, or Firm*—Armstrong, Nikaido, Marmelstein & Kubovcik

[57] ABSTRACT

A friction material wherein a heat-resistant organic fiber, which is a carbon fiber and/or a phenol fiber less than 10 mm in length, is mixed in a composition of the friction material containing a ferrous fiber and formed with a thermosetting resin binder. In particular, a friction material for braking is formed from a composition containing 5–60 wt. % of a ferrous fiber, 0.3–20 wt. % of a carbon fiber and/or a phenol fiber of less than 10 mm in length, 0.5–15 wt. % of an organic dust, 2–20 wt. % of an inorganic filler, 5–25 wt. % of lubricant, 0.2–10 wt. % of an antimony trioxide, 0–20 wt. % of a metallic powder and 3–15 wt. % of a phenol binder under heat and pressure.

4 Claims, 1 Drawing Figure

FRICTION MATERIAL

DETAILED DESCRIPTION OF THE INVENTION

The present invention relates to a novel non-asbestos friction material.

The friction material reinforced by steel fiber has been presently developed as a non-asbestos friction material. However, in the conventional friction material reinforced by steel fiber, the binding condition between a steel fiber and a phenol resin has not always been satisfactory and has resulted in a defects such as an exfoliation of the steel fiber due to a frictional force, so that the reinforcement and the security of coefficient of friction of the friction material reinforced by steel fiber has not been sufficiently attainable.

Furthermore, in an especially high load condition, for example, the wear due to a less strength increases noticeably and, in case of an especially high coefficient of friction requirement, the addition of ceramics, which are high in hardness, is necessary in order to prevent a lowering of coefficient of friction which results in unfavorable problems of kindness to the mating material, increasing a noise property, etc.

The inventor has made various researches to solve these problems and has discovered the following. In the friction material containing ferrous fiber such as steel fiber, etc. which is formed with thermosetting resin binder of epoxides, melamines, etc., if the steel fiber was retained in the friction material in a favorable condition and was prevented from exfoliation due to frictional force, a stable coefficient of friction would be obtained.

Based on the above, the inventor has studied the shape of the steel fiber and the improvement of the quality of the phenol resin, etc., as a method of retaining the steel fiber in a favorable condition during friction, but failed to attain an improved frictional material.

The inventor has continued the study for an improvement and discovered a method of using jointly with the steel fiber a heat-resistant fiber which particularly excels in mixing property, clinging property, etc., by means of mixing with other fiber of high strength, and thus attained the purpose of the present invention of an improved friction material.

As the heat-resistant fiber used for the present invention, a carbon fiber and a phenol fiber are advantageous since these fibers bring about a noticeably good result.

As for the above heat-resistant fiber, an fiber, which is carbonated in the presence of inert gas between 700° C.-3,000° C., is advantageous. Further, the phenol fiber also has the same effect as the carbon fiber and it is presumed that the phenol fiber is carbonated by friction heat so as to give the same effect as the carbon fiber. The length of the organic fiber is preferable in less than 10 mm considering the mixture with the steel fiber. This is because, if the length of the fiber is longer than 10 mm, the mixture with steel fiber becomes poor and fails to obtain a good result.

Figure 1:
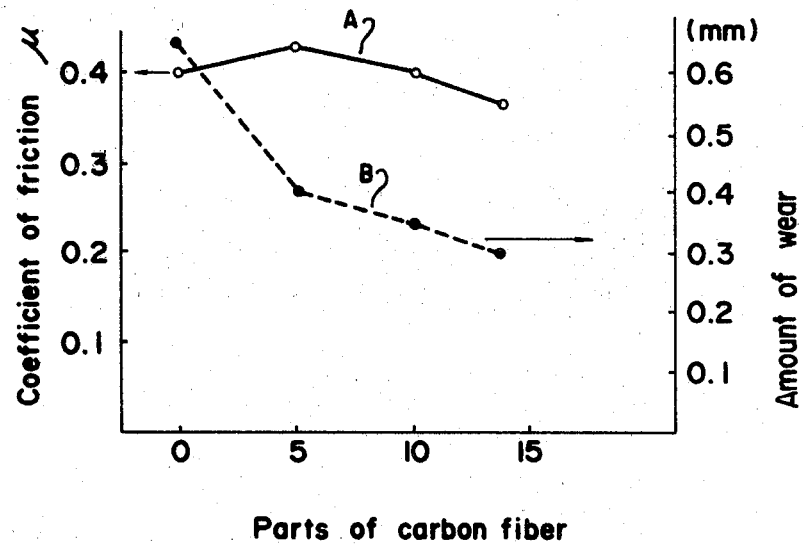
FIG. 1 is a graph of indicating a relationship between the amount of the carbon fiber, the coefficient of friction and the amount of wear in the embodiment example of the present invention.

A: Curve of coefficient of friction
B: Curve of amount of wear.
Abscissa: amount of carbon fiber
Ordinate: Coefficient of friction ($\mu$) and amount of wear (mm).

The invention will be more clearly understood with reference to the following example.

EMBODIMENT EXAMPLE

Compounding composition of the friction material (weight parts)

| | |
|---|---|
| Steel fiber | 45 |
| Cashew dust | 3 |
| Rubber dust | 3 |
| Barium sulfate | 15 |
| Graphite | 15 |
| Metallic powder (iron powder, reduction iron powder, brass powder, copper powder) | 10 |
| Antimony trioxide | 2 |
| Phenol resin | 7 |

0, 5, 10 and 15 weight parts of the carbon fiber were respectively added to the above composition and the friction materials thus obtained were tested by a full-size dynamometer under JASO C406-74 with the results as indicated in FIG. 1.

In the comparison example containing 0 parts of the carbon fiber, 5 weight parts of hard ceramics were added for comparison since the coefficient of friction was low.

As apparent from the above example, it was observed that the friction material which did not contain the heat-resistant fiber had more amount of wear (B curve), and the addition of the heat-resistant fiber raises the coefficient of friction (A curve) and reduces the amount of wear remarkably.

The above results show that the steel fiber exists in the friction material in a favorable condition. As the quantity of the heat-resistant organic fiber increases, the coefficient of friction decreases due to the lubrication of the fiber and, therefore, the quantity of the heat-resistant fiber is preferable in less than 15%. The amount of wear tends to lower as amount of the heat-resistant fiber increases.

What is claimed is:

1. A friction material for braking, wherein a composition containing 5-60 wt.% of a ferrous fiber, 0.3-20 wt.% of a carbon fiber and/or a phenol fiber less than 10 mm in length and comprising 0.5-15 wt.% of an organic dust, 2-20 wt.% of an inorganic filler, 5-25 wt.% of lubricant, 0.2-10 wt.% of an antimony trioxide and 0-20 wt.% of a metallic powder is formed with 3-15 wt.% of a phenol binder under heat and pressure.

2. A friction material for braking as defined in claim 1 wherein said organic dust is a cashew dust and/or a rubber dust.

3. A friction material for braking as defined in claim 1 wherein said inorganic filler is an inorganic powder of a barium sulfate, a calcium carbonate or a calcium silicate.

4. A friction material for braking as defined in claim 1 wherein said lubricant is a graphite and/or a molybdenum disulfide.

* * * * *